United States Patent
Barnett et al.

(10) Patent No.: US 9,579,574 B2
(45) Date of Patent: Feb. 28, 2017

(54) IMAGE CAPTURE METHOD AND APPARATUS

(71) Applicant: Sony Computer Entertainment Europe Limited, London (GB)

(72) Inventors: Stuart Barnett, London (GB); Daniel Jeffery, London (GB); Benjamin John Archard, London (GB); James Thomas Southworth, London (GB); Eric Dustin Hideo Miller, London (GB)

(73) Assignee: Sony Computer Entertainment Europe Limited (GB)

( * ) Notice: Subject to any disclaimer, the term of this patent is extended or adjusted under 35 U.S.C. 154(b) by 0 days.

(21) Appl. No.: 14/704,198

(22) Filed: May 5, 2015

(65) Prior Publication Data
US 2015/0321103 A1 Nov. 12, 2015

(30) Foreign Application Priority Data

May 8, 2014 (GB) .................................. 1408158.2

(51) Int. Cl.
*A63F 13/25* (2014.01)
*A63F 13/63* (2014.01)
(Continued)

(52) U.S. Cl.
CPC .............. *A63F 13/63* (2014.09); *A63F 13/25* (2014.09); *A63F 13/49* (2014.09); *A63F 13/87* (2014.09);
(Continued)

(58) Field of Classification Search
None
See application file for complete search history.

(56) References Cited

U.S. PATENT DOCUMENTS

| 6,141,034 A * | 10/2000 | McCutchen | G02B 27/22 348/36 |
| 6,507,665 B1 * | 1/2003 | Cahill | G06T 3/0081 348/E13.014 |

(Continued)

FOREIGN PATENT DOCUMENTS

| WO | 0244808 A2 | 6/2002 |
| WO | 2012166593 A2 | 12/2012 |

OTHER PUBLICATIONS

Great Britain Combined Search and Examination Report for Application No. GB1408158.2 dated Nov. 4, 2014.

(Continued)

*Primary Examiner* — Ashish K Thomas
(74) *Attorney, Agent, or Firm* — Lerner, David, Littenberg, Krumholz & Mentlik, LLP

(57) ABSTRACT

A method of stereoscopic panoramic image capture of a virtual environment is provided. The method includes pausing the state of a virtual environment being implemented by an application. For each of a plurality of positions in the virtual environment, the method includes rendering in turn plural images collectively encompassing a panoramic view. The method also includes capturing in turn each of the plural rendered images and capturing distance data describing the distance between a respective position in the virtual environment and surfaces in the virtual environment visible at that respective position. The plural positions in the virtual environment form vertices of a bounding space within which left and right viewpoints of a stereoscopic image can be formed.

15 Claims, 11 Drawing Sheets

(51) Int. Cl.
  *H04N 5/232* (2006.01)
  *G06T 15/40* (2011.01)
  *A63F 13/87* (2014.01)
  *H04N 13/04* (2006.01)
  *G06T 19/00* (2011.01)
  *H04N 13/02* (2006.01)
  *A63F 13/49* (2014.01)

(52) U.S. Cl.
  CPC ............ *G06T 15/40* (2013.01); *G06T 19/006* (2013.01); *H04N 5/23238* (2013.01); *H04N 13/0275* (2013.01); *H04N 13/044* (2013.01); *A63F 2300/8082* (2013.01)

(56) References Cited

U.S. PATENT DOCUMENTS

| | | | | |
|---|---|---|---|---|
| 7,120,313 | B2* | 10/2006 | Kotake | G06T 1/20 382/282 |
| 2008/0246759 | A1* | 10/2008 | Summers | G06F 3/0304 345/420 |
| 2008/0316301 | A1* | 12/2008 | Givon | G03B 35/00 348/49 |
| 2009/0100379 | A1* | 4/2009 | Borchers | G09B 9/00 715/851 |
| 2011/0214022 | A1* | 9/2011 | Burchard | G06F 1/3228 714/45 |
| 2012/0127169 | A1* | 5/2012 | Barcay | G06T 15/20 345/419 |
| 2013/0103303 | A1* | 4/2013 | Lynch | G01C 21/3638 701/410 |
| 2013/0106991 | A1* | 5/2013 | Misawa | H04N 5/23238 348/36 |
| 2014/0213361 | A1* | 7/2014 | Zhang | A63F 13/211 463/31 |
| 2015/0358612 | A1* | 12/2015 | Sandrew | H04N 13/0257 348/36 |

OTHER PUBLICATIONS

Stephanelx: "VR Player—Home. version 34", Feb. 5, 2014 (Feb. 5, 2014). XP055211159, Retrieved from the Internet: URL:http://vrplayer.codeplex.comjwikipage? version=34 [retrieved on Sep. 3, 2015] *Software features and available projections.

Anonymous: "World's First Fully Spherical 3D 360 Video and Photo Gear : 360Heros : VR : Virtual Reality", Jan. 7, 2014 (Jan. 7, 2014), XP055211243, Retrieved from the Internet: URL:http://www.360heros.com/2014/01/worlds-first-fully-spherical-3d-360-video-and-photo-gear/[retrieved on Sep. 4, 2015] * p. 2: 360Hero stereoscopic video capture. playback using VRPlayer for Oculus Rift.

Supersinfulsilicon—Software: "MaxVR : Apps : Oculus Share", Aug. 16, 2014 (Aug. 16, 2014), XP055211197, Retrieved from the Internet: URL:https:jjshare.oculus.comjappjmaxvr [retrieved on Sep. 4, 2015] * p. 2. MaxVR software Features.

European Search Report for Application No. EP15164511 dated Sep. 16, 2015.

* cited by examiner

IMAGE CAPTURE METHOD AND APPARATUS

CROSS REFERENCE TO RELATED APPLICATIONS

The present application claims the benefit of and priority to GB Application No. 1408158.2, filed May 8, 2014, the entire disclosure of which is incorporated by reference herein.

BACKGROUND OF THE INVENTION

Field of the Invention

The present invention relates to an image capture method and apparatus.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Recently announced virtual reality (VR) head mounted displays (HMDs) such as the Oculus Rift® and the Sony® Project Morpheus VR headset have made mainstream VR gaming and other experiences more likely in the near future.

Such experiences typically involve seeing a 90° to 100° horizontal field of view (and typically a 45°-50° vertical field of view) supplied by the HMD, which also tracks head movement so that this field of view can move with the user's head, enabling a full 360° exploration of the virtual environment as they look around.

At the same time as this move to VR, there is a widespread convergence of video gaming and social media, leading to the provision of means by which to share gaming experiences, such as live game streaming using Twitch.tv®.

As a result there is likely to be a desire to share in-game VR experiences with other gamers, who themselves may or may not have an HMD.

SUMMARY OF THE INVENTION

The foregoing paragraphs have been provided by way of general introduction, and are not intended to limit the scope of the following claims. The described embodiments, together with further advantages, will be best understood by reference to the following detailed description taken in conjunction with the accompanying drawings.

In a first aspect, a method of stereoscopic panoramic image capture of a virtual environment is provided in accordance with claim 1.

In another aspect, a method of viewing a captured stereoscopic panoramic image is provided in accordance with claim 11.

In another aspect, an apparatus for stereoscopic panoramic image capture of a virtual environment is provided in accordance with claim 14.

In another aspect, an apparatus for viewing a captured stereoscopic panoramic image of a virtual environment is provided in accordance with claim 15.

Further respective aspects and features of the invention are defined in the appended claims.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
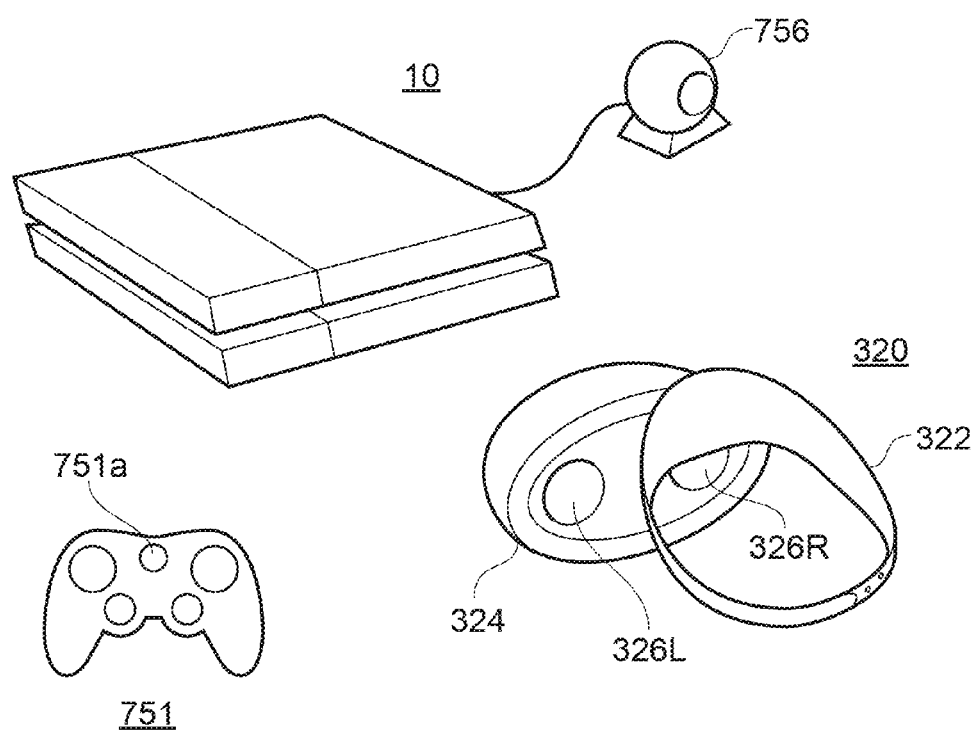
FIG. 1 is a schematic diagram of an entertainment system in accordance with embodiments of the present invention.

Referring now to the drawings, wherein like reference numerals designate identical or corresponding parts throughout the several views, an image capture method and apparatus are disclosed. In the following description, a number of specific details are presented in order to provide a thorough understanding of the embodiments of the present invention. It will be apparent, however, to a person skilled in the art that these specific details need not be employed to practice the present invention. Conversely, specific details known to the person skilled in the art are omitted for the purposes of clarity where appropriate.

Referring to FIG. 1, an entertainment device 10, such as the Sony® PlayStation 4 ®, is operable to wirelessly receive user inputs from a controller such as the DualShock 4 controller 751 in order to control an application, such as the operating system (OS) menu or a game. In addition, the entertainment device is operable to output video signals to a display such as a television (not shown) or a head-mounted display (HMD) 320, such as the Sony® Project Morpheus VR headset. This particular headset comprises a headband 322 from which a display unit 324 depends, thereby reducing the weight of the unit that rests on the user's nose. The display unit itself comprises two display assemblies 326L, R, typically comprising LCD or OLED displays and optics to enable the user to view them. It will be appreciated however that any suitable VR HMD may be considered.

The two display assemblies may be fed with a common video feed from the entertainment device, giving the appearance to the user of viewing a large screen directly in front of them. Alternatively (and more commonly) the two display assemblies are fed left and right images of a stereoscopic pair of images, giving the user a sense of immersion and depth in an environment.

Optionally the video feed may be split and also sent to a TV so that other people can see what is being presented to the HMD. If the TV is a 2D television, then either the common video feed or the left or right video feed may be supplied as appropriate. Meanwhile if the TV is a 3D television, then alternatively the left and right video feed may be supplied when available.

The video signal is typically sent to the HMD via an HDMI cable, but in principle may be transmitted wirelessly.

The HMD may comprise motion tracking means such as accelerometers to determine head position and orientation, and/or may comprise markers to enable tracking by the entertainment device using a video camera 756. The markers are typically illuminated regions of the HMD, enabling tracking in low light levels.

Figure 2:
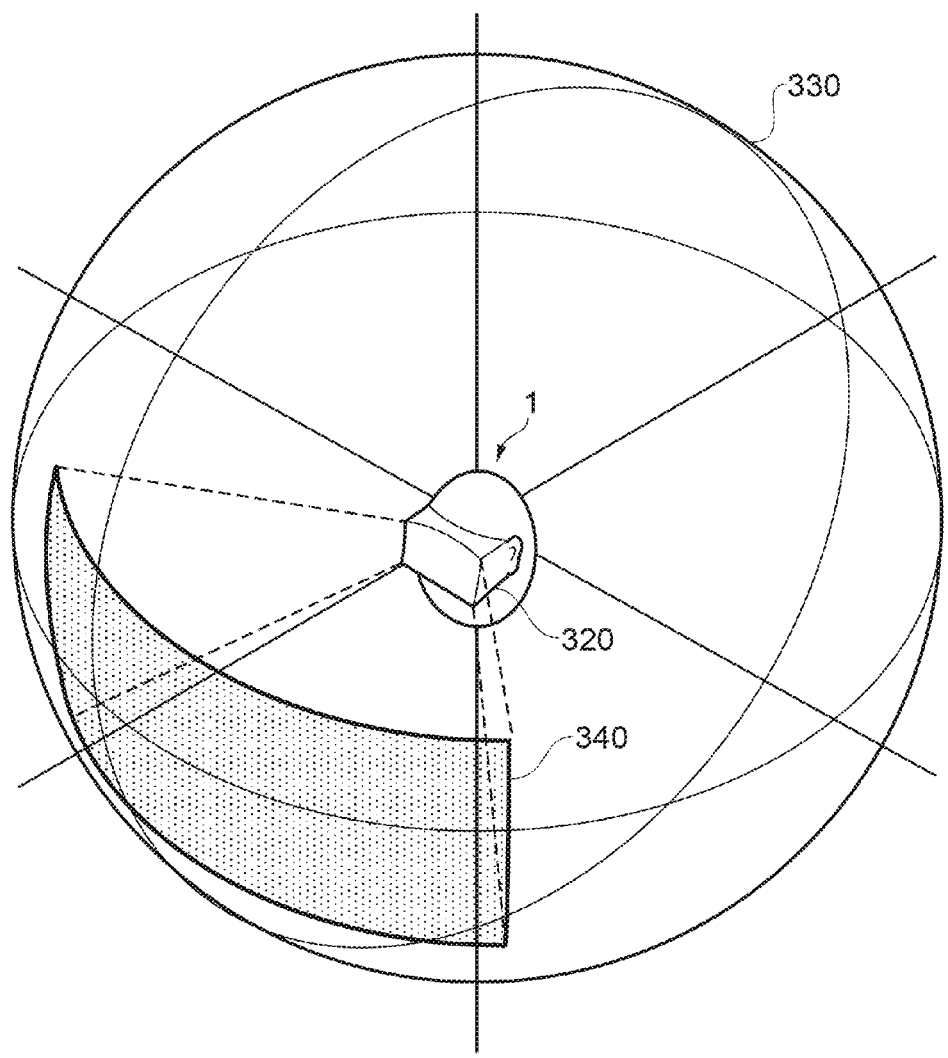
FIG. 2 is a schematic diagram of a spherical viewing space and a viewpoint within that space.

Referring now also to FIG. 2, it will be understood that the field of view (340) of the HMD (320) will be in the order of 90° to 100° horizontally but less vertically, due to the displays typically having a 16:9 aspect ratio and also due to the horizontal but not vertical offset of viewpoints provided in stereoscopic vision. Hence the vertical field of view is typically half that of the horizontal field of view.

Hence the field of view (340) actually seen at any one time by the user (1) is in the order of 100°×50°, and hence is only a small portion of the potentially viewable 360°×360° spherical panoramic (330) view surrounding the user.

It will be appreciated that in practice this spherical panoramic does not exist during game play; whilst the game world may be defined all around the player, only those elements of the game world that coincide with the displayed field of view are actually rendered for display.

This approach is taken in order to limit the number of textures needed in video memory and the number of polygons to process for texturing, z-clipping etc., and hence to increase the number of video frames that can be rendered by the entertainment device for the field of view actually seen by the user.

Hence to see the 360°×360° spherical panoramic view surrounding the user, the user must view it incrementally by moving their head, and hence the direction of their field of view, in different directions so that their 100°×50° field of view maps on to different parts of the sphere. At each point in time (i.e. for each video frame or pair of video frames) as the user moves their head, only the field of view visible at that moment is rendered.

As a result the whole spherical panoramic is never rendered at once.

Subjectively, this is generally not a problem for the user during game play, as we are used to only seeing a limited field of view in real life, and are comfortable with integrating partial viewpoints of our immediate surroundings to form a mental model of the whole environment, by moving our heads to look around. Our subjective experience can thus include the whole 360°×360° spherical panoramic view, even though it is not all seen at once.

However, a problem arises if a user wishes to share this experience with another user. Conventional screen capture techniques store the rendered video image currently in video memory to some other long term memory, thereby allowing the rendered viewpoint to be stored for subsequent viewing (or use by another application, for example to upload to a sharing website).

However, as explained previously, the currently rendered field of view in the VR HMD application will only be a small fraction of the possible 360°×360° spherical panoramic view surrounding the user and which the user may be subjectively aware of and wishing to share. Hence a conventional screen capture approach does a poor job of capturing the user experience when a using VR HMD.

As noted above, the user gains their appreciation of the wider environment by looking around in it. Hence a possible solution is to capture a video sequence output by the entertainment device for sharing with others, as in the service provided by Twitch.tv®. However this also has problems. The first is that a video sequence at for example 30 frames per second will generate a very large amount of data. As a result typically the images are bandwidth compressed to a lower resolution and fidelity than the original. This significantly reduces the quality of the experience and indeed can disrupt the stereoscopic effect where this is being streamed. The second and possibly more significant problem is that the viewpoint in the video is dictated by the head movements of the original user. A friend, viewing the video sequence on a TV or more particularly on their own VR HMD will experience changes in viewpoint that are unexpected and dissociated from their own head and body movements, which is likely to lead to nausea.

As a result, it would be desirable to allow the friend to control their own viewpoint of the environment as captured by the first user.

First Embodiment

In a first embodiment of the present invention, a process for generating a spherical panoramic snapshot of the environment is provided as described below.

In the first embodiment, a snapshot means—for example a processor operating under suitable software instruction, or equally an ASIC (application specific integrated circuit) or an FPGA (field programmable gate array) or other configurable circuit—is integrated with either the operating system (OS) of the entertainment device, or into a software development kit (SDK) commonly used by application developers.

If the snapshot means is integrated into the OS then it can interact with the application (e.g. the game) through an API. If the snapshot means is integrated into the SDK, then it may become part of a middleware layer in the entertainment device that interacts with the application through an API, or it may be integrated into the build of the application itself automatically.

In this way, the snapshot means can be arranged to work with any game that uses the API and/or uses the SDK.

This also enables a common user interface to be provided between applications for activating the snapshot means. For example a dedicated 'share' button 751*a* may be provided on the controller; upon pressing this button, the entertainment device may cause the application to freeze its game state and then present a social media menu comprising among other things the option to take a snapshot. Alternatively pressing the share button may cause the application to freeze its game state and then take a snapshot immediately. This second option may in turn be dependent upon the device detecting that the user is wearing a head mounted display.

In any event, in the embodiment, the snapshot means operates on a frozen or suspended game state of the application; i.e. a single moment of in-game time. Hence the position and characteristics of each component of the virtual environment remain fixed.

Figure 3A:
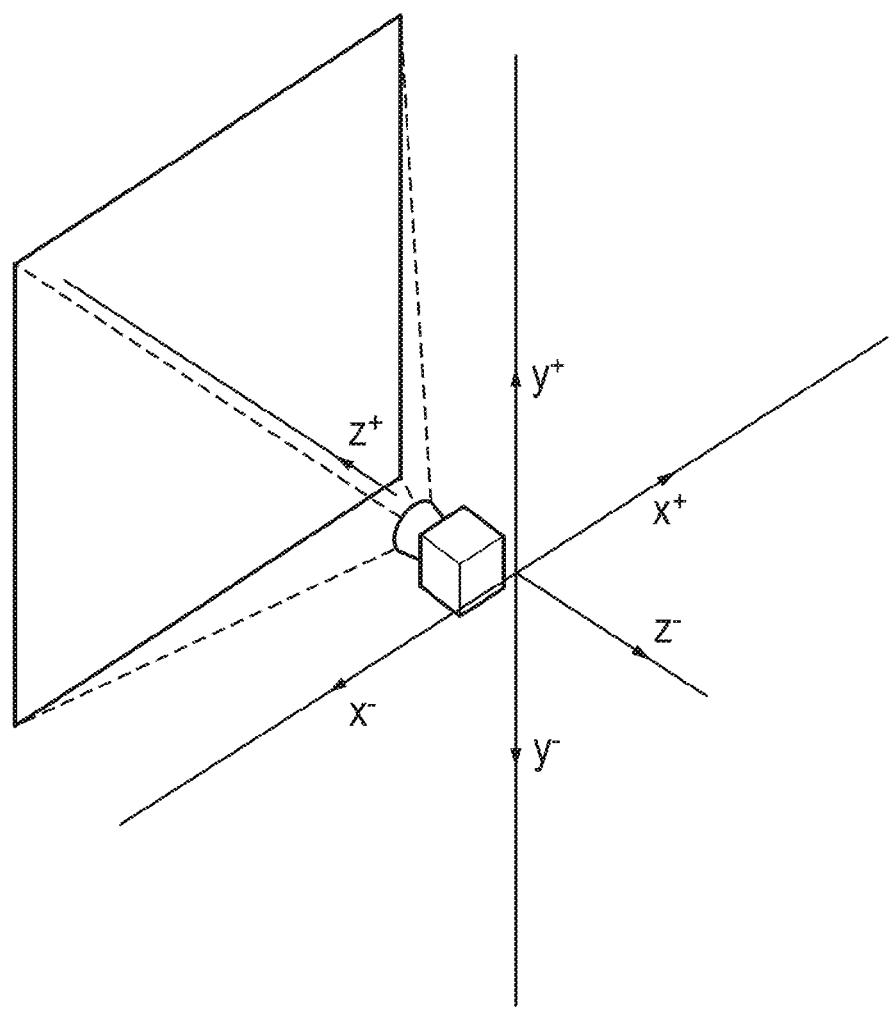
FIG. 3A is a schematic diagram of the capture of an image in a cube map, in accordance with embodiments of the present invention.
Figure 3B:
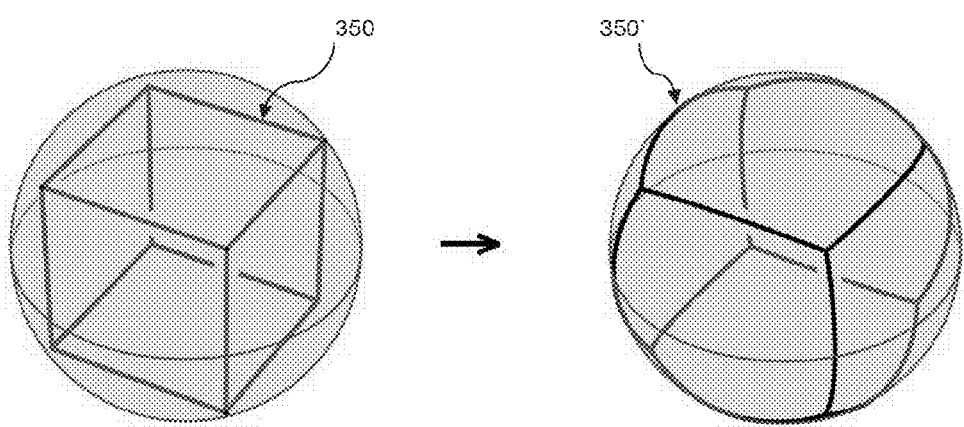
FIG. 3B is a schematic diagram of the projection of a cube map onto a sphere, in accordance with embodiments of the present invention.

Referring now also to FIGS. 3A and 3B, in this state the snapshot means is operable to generate a cube map of the virtual environment. A cube map comprises 6 renders, one in each direction on the three axes, giving views in directions $x^+$, $x^-$, $y^+$, $y^-$, $z^+$ and $z^-$. FIG. 3A illustrates a virtual camera capturing the image in the z+ direction.

The resulting six rendered images then form a cube 350, providing that the edges of their viewpoints meet or overlap.

FIG. 3B then shows that this cube 350 can be projected onto a sphere 350' by distorting the faces of the cube appropriately. As a result, by taking 6 images corresponding to the faces of a cube, and then distorting these to map onto a sphere, a spherical snapshot can be taken of the environment.

It will be appreciated that the snapshot means can instruct the current videogame to render the suspended scene at the current camera position in the currently defined direction of view, and then redefine the view five times to generate the opposite view and pairs of views on the other two orthogonal axes. Alternatively, the snapshot means can instruct the current videogame to render the suspended scene at the current camera position but in default directions parallel to the axes of a global origin within the game world, so as to simplify any subsequent viewing processes.

In anticipation of the spherical distortion that occurs when transforming from a cube map to a sphere, the snapshot means can instruct the current videogame to render the suspended scene with an inverse image distortion included, so that when subsequently mapped to a sphere any apparent distortion of the environment is substantially avoided.

It will be appreciated that preferably the snapshot means is operable to instruct the in-game renderer via the API (and/or via an internal communication if the snapshot means is built into the game). This allows the snapshot means to generate images that look the same as those experienced by the user of the game, and also allows the snapshot means to take advantage of any innovation or characteristic appearance of the in-game renderer. In addition, because the images do not need to be rendered at a particular frame rate, optionally the rendering quality can be increased for the snapshot; for example the resolution may be increased, and/or the draw distance may be increased; similarly lighting and shadow effects may be improved; and so on.

The renderer may also be instructed to omit certain elements of the environment; for example in many first person shooting games, a representation of the user's hands and a weapon are often shown on-screen. Preferably, these are omitted from 5 out of 6 captured images forming the cube map to avoid them re-appearing at multiple positions in the spherical panorama. Optionally they may be omitted from all 6 images to provide an unobstructed view. Meanwhile in 3$^{rd}$ person perspective games where the user's avatar is visible on screen at a specific point within the environment due to an offset virtual camera tracking them, typically the avatar will therefore only appear in views that encompass the avatar's position within the game world. Nevertheless the user may be provided with the option to omit their avatar if they wish.

In either case, the renderer may also be instructed to omit any game-related overlays like health status, text messages and the like from each viewpoint to avoid obstruction and repetition.

Alternatively, or in addition to the above, the snapshot means may comprise its own renderer operable to render the images in a standard manner similar to that described above. This may be of use where there are problems communicating with the in-game renderer, or where the in-game renderer cannot implement a requested function such as pre-distorting the rendered image.

In this latter case, it will also be appreciated that a conventionally rendered image used in a cube map can be pre-distorted after rendering, but this will result in a minor loss of fidelity where pixels are interpolated during the distortion process.

The resulting spherical panorama can then be viewed either using a conventional interface such as a TV or monitor together with a mouse or controller, or using a head mounted display and movements of the viewer's head.

In this second case, it will be appreciated that the same viewpoint would be supplied to both left and right eyes, resulting in a flat display of the environment, and the subjective effect would be to be inside a spherical photograph rather than being immersed in the videogame environment. Whilst this may be acceptable in some circumstances, it would be preferable to provide a stereoscopic experience.

It will be appreciated that when generating a stereoscopic display for the original user of the game, two viewpoints are generated at left and right eye positions in the game space separated by a defined eye distance, typically in the order of 65 mm. This is known as the inter-ocular distance and the different viewpoints provide a parallax effect in the two images generated, resulting in a subjective 3D effect.

Figure 4A:
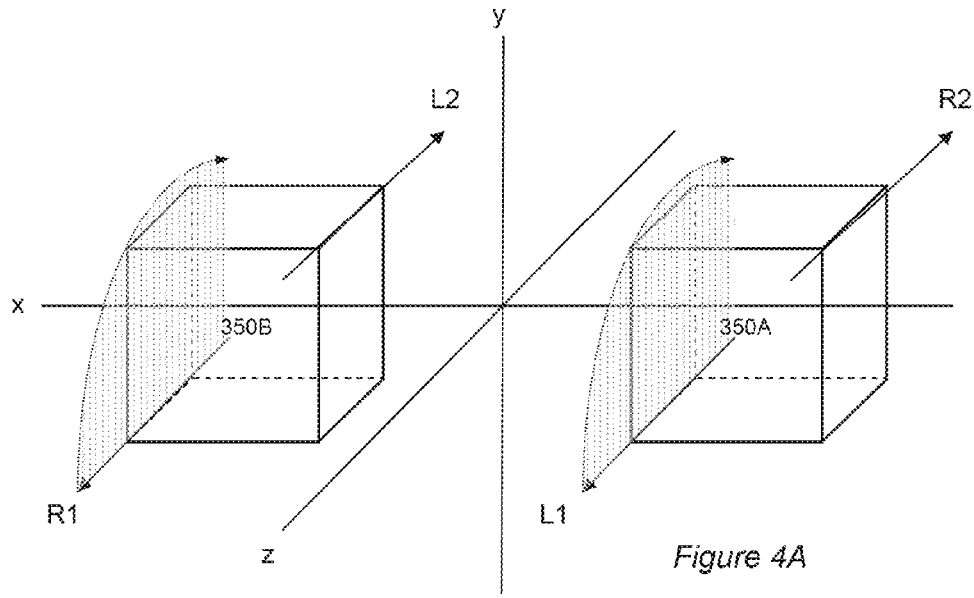
FIG. 4A is a schematic diagram of stereoscopic capture of a scene using two cube maps, in accordance with a first embodiment of the present invention.

Accordingly, referring now also to FIG. 4A, in a stereoscopic instance of the first embodiment of the present invention, to a first approximation two cube maps 350A,B can be rendered, optionally respectively centred on the left and right eye positions.

These cube maps would provide a 360° stereoscopic view within the z-y plane (i.e. looking up and down). For clarity of understanding and for illustration purposes only, a 90° arc in the z-y plane is shown as a striped area in FIG. 4A to indicate of looking up from a first position facing forwards, with the eye viewpoints L1, R1 assigned to the user's left and right eyes respectively. If the user face the other way, then the assignment of the cube maps would be reversed, and the eye viewpoints L2, R2 are assigned to the user's left and right eyes respectively.

However in this example, as the user turns left or right to look towards the x axis, the stereoscopic view increasingly degrades so that, for example, when looking directly to the left or right, one cube map simply looks directly through the centre of the other cube map so that there is no inter-ocular distance, no parallax, and hence no depth at all, and merely a small mismatch in scale.

Figure 4B:
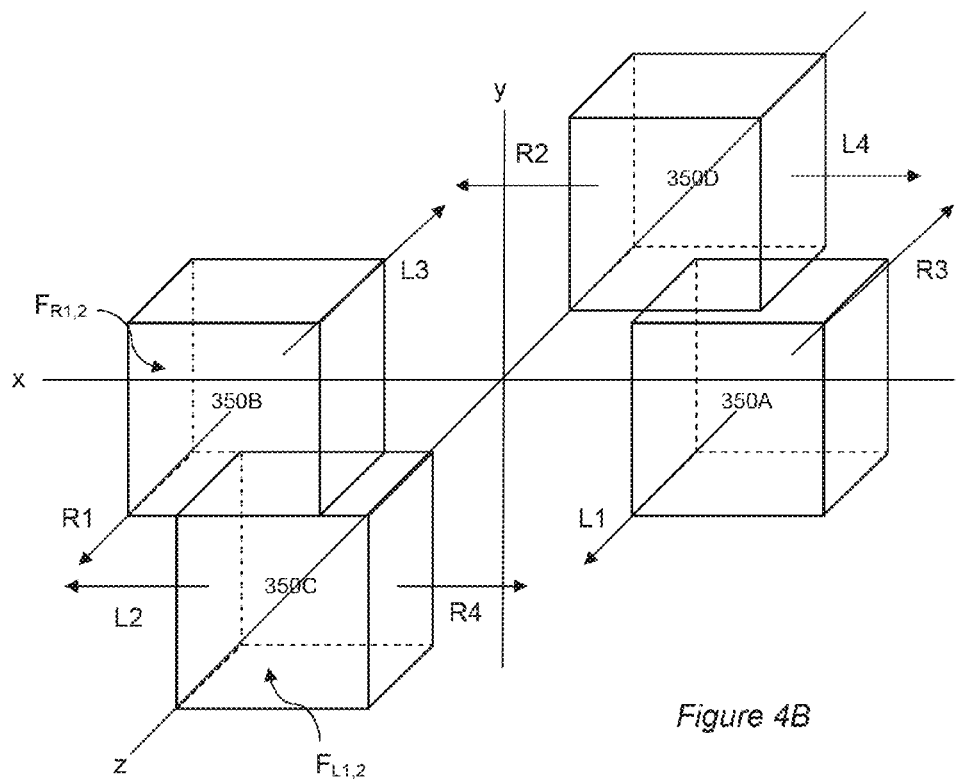
FIG. 4B is a schematic diagram of stereoscopic capture of a scene using four cube maps, in accordance with a first embodiment of the present invention.

Therefore, referring now also to FIG. 4B, in a stereoscopic instance of the first embodiment of the present invention, to a second approximation two additional cube maps 350C,D can be rendered, totaling 4 maps, respectively centred on left and right eye positions in a first direction (e.g. co-located on the x-y plane) and in a second, orthogonal direction (e.g. co-located on the y-z plane).

Now, there are four left-right eye viewpoints labelled L1,R1; L2,R2; L3,R3; and L4,R4. It is now in principle possible to look along the z axis and up/down in the y axis, and also to look along the x axis and up/down in the y axis.

Figure 4C:
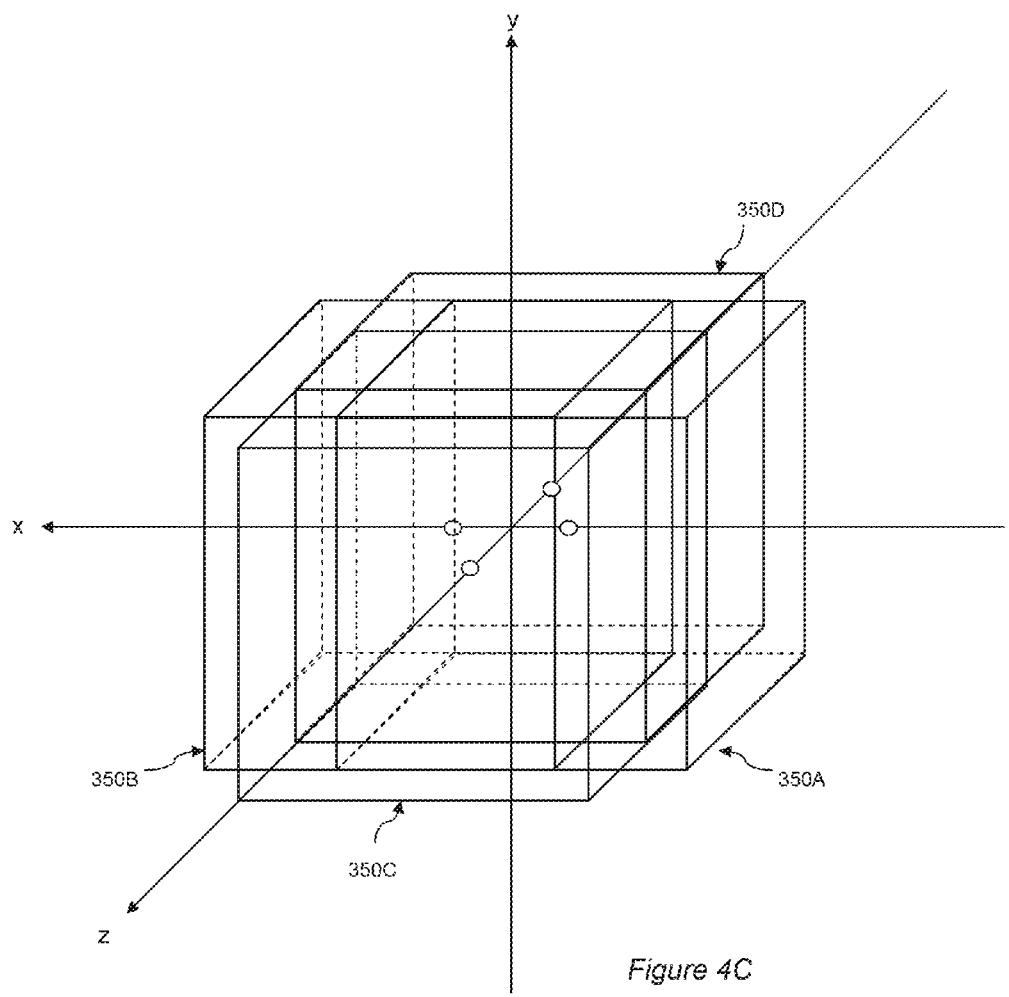
FIG. 4C is a schematic diagram illustrating the overlap between cube maps, in accordance with embodiments of the present invention.

Finally, it should be appreciated that FIGS. 4A and 4B have been illustrated to artificially separate the cube maps; Referring now also to FIG. 4C, it will be appreciated that the inter-ocular distances on the x and z axes are much smaller than the effective span of the images in the cube map, and hence in fact the four cube maps substantially overlap in volume. Hence for example the images labelled $F_{L1,2}$ and $F_{R1,2}$ in FIG. 4B, facing the x-axis, can be used to contribute to a stereoscopic view of the scene as a viewer rotates from viewpoint L1,R1 to viewpoint L2, R2. Similar transitional images exist for rotations between the other viewpoints.

Furthermore, the subsequent projection of each cube 350 onto a sphere 350' serves to improve the result of merging contributions from plural cube maps, as this serves to move the edges of images that are looking in similar directions closer to each other in the viewing space. Hence for example there will be a smoother transition between image $F_{L1,2}$ and image L2, and between image $F_{R1,2}$ and image R2, when projected onto a sphere.

Second Embodiment

The above first embodiment and its variations are based on the assumption that only image information is stored, and that image pairs (based on the spherical projections) are presented to the second viewer in order to create the stereoscopic effect. As such, it is assumed that the viewing system used by the second viewer to display the images has no independent rendering or image processing capability of its own, beyond displaying the captured images (and possibly applying the spherical projection to images from cube maps).

However, if the system used by the second viewer to display images was able to make use of image data and depth information to create stereoscopic images, then the approach used could be slightly different.

Hence in a second embodiment of the present invention, the snapshot means described previously operates in a similar manner to capture a single cube map of the in-game environment at a suspended moment in time, substantially as described above, and again with optional modifications such as removal of $1^{st}$ person avatar elements and on-screen overlays, and optionally with pre-distortion in the render to substantially correct for distortions due to spherical projection later on.

Figure 5:
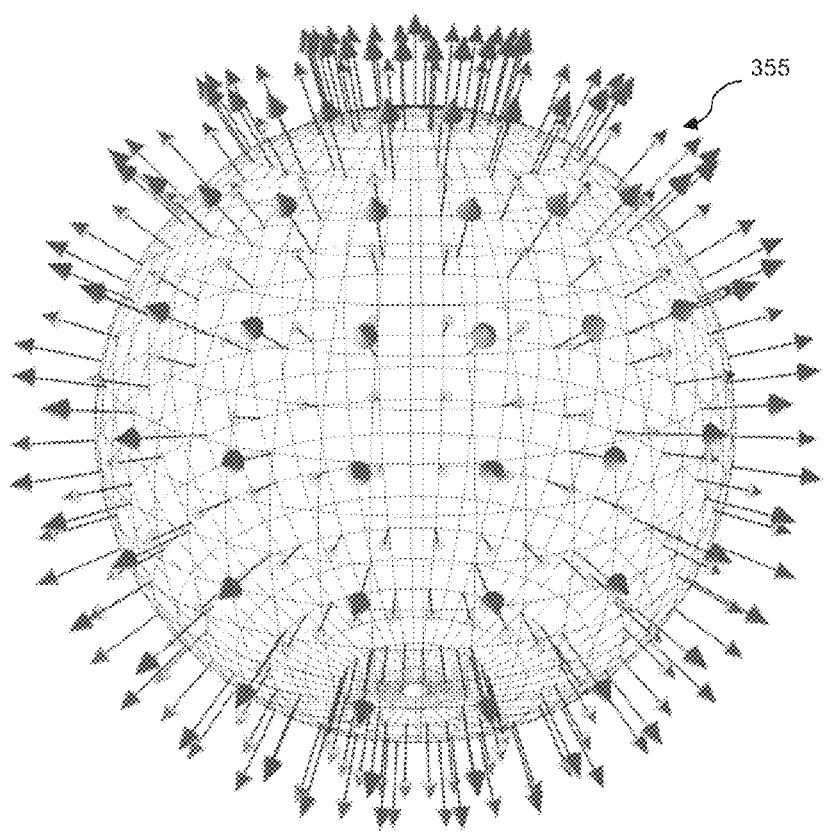
FIG. 5 is a schematic diagram illustrating distance measurements with respect to a viewpoint, in accordance with a second embodiment of the present invention.

However, referring now also to FIG. 5, in this case a parallel data set 355 is also created by the snapshot means, the data set being a measurement of distances to each visible surface in the virtual environment from a point coincident with the centre of the cube map.

The snapshot means can be arranged to sample distances in the environment at angular intervals equivalent to the per-pixel angular pitch of the cube map images when projected onto a sphere at a predetermined viewing resolution, so that depth information is obtained for each pixel shown in a final view. Alternatively a lower angular resolution measurement can be used, and distance information can be interpolated. For example a resolution of one measurement per 2×2 pixels or per 3×3 pixels or more may be used.

Hence whilst the actual data will be in the form of an ordered list or similar data structure, it describes a sampled sphere of distance values centred on a point co-incident with the centre of the cube map. The data set therefore acts as a spherical depth map for the eventual spherical projection of the cube map.

Using the cube map and the depth map, a viewing means (typically another entertainment device with a viewing program) can generate a stereoscopic view by generating two images based upon a currently viewed portion of the spherical projection of the cube map, with image elements of the currently viewed portion of the spherical projection horizontally offset from each other in the left and/or right eye images as a function of distance, so re-creating a stereoscopic parallax effect.

However, it will be appreciated that where one or both viewed images do not coincide with the virtual camera position used when generating the cube map (as will happen when generating a stereoscopic image from a cube map) then there will be regions of such images where some background features are revealed by the relative change in position of foreground features. However, the image information for such revealed background features is not available in the cube map, because they are never seen from the position in the virtual environment at which the cube map was generated.

As a result, an instance of the second embodiment, to a first approximation gaps can either be left in one or both generated images (which is undesirable), or image features can be propagated to fill these gaps. For example, if a foreground object appears to move to the right due to parallax, then background textures adjacent on the left to the resulting gap can be propagated to the right to fill the gap, using any suitable cloning method. However, this approach is imperfect and can lead to clear artefacts in the final image.

Consequently it would be preferable to have access to actual rendered pixel information for such background features.

Accordingly, in a preferred instance of the second embodiment, plural cube maps each with respective spherical depth maps are generated at different positions within the environment, typically collectively centred on the position of the original in-game viewpoint at the moment the game state was frozen.

The plurality of cube maps, capturing images from different positions, thus provide image redundancy comprising access to actual rendered pixel information for background features for any generated stereoscopic image pair whose two viewpoint positions fall within the bounding space between the viewpoint positions of the cube maps.

Hence for example using 4 cube maps, a tetrahedral space can be defined, within which it is possible to generate a stereoscopic pair of images for two viewpoint positions that lie within the bounded volume of the tetrahedron Alternatively, using 5 cube maps, a triangular di-pyramid or hexahedron can be formed.

Alternatively, using 6 cube maps, a di-pyramid or octahedron can be formed.

Figure 6:
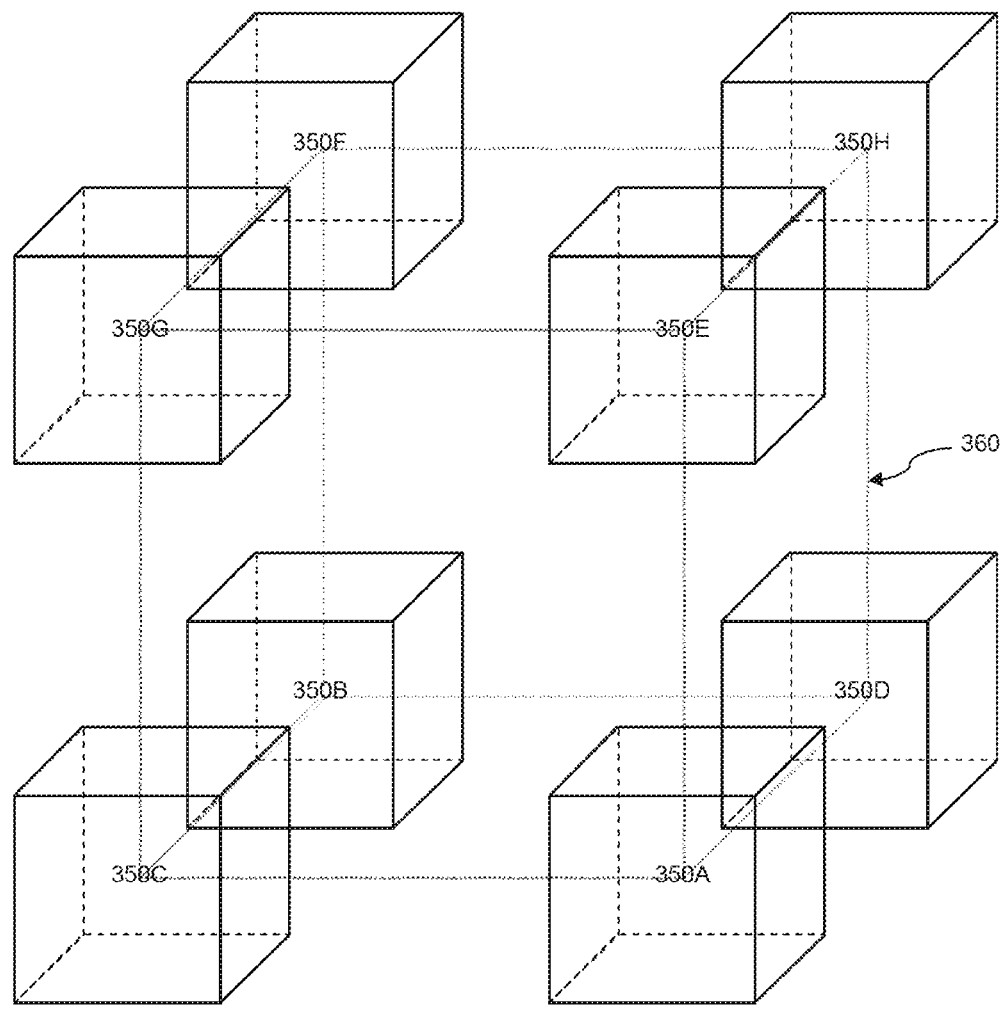
FIG. 6 is a schematic diagram of the capture of a scene using eight cube maps forming a bounding volume, in accordance with a second embodiment of the present invention.

Similarly alternatively, using 8 cube maps a cubic space may be formed. This arrangement is shown in FIG. 6, where eight cube maps 350A,B,C,D,E,F,G,H form a cubic bounding space 360 within which stereoscopic viewpoints can be located.

In any of these cases, providing that the two viewpoints used to generate the stereoscopic images for the second viewer are within the bounds of the space formed by the viewpoints located at the respective centres of the plural cube maps, then there will be pixel information within the plurality of cube maps to appropriately fill-in background features revealed by the parallax of the stereoscopic image.

Accordingly, using 4, 5, 6 or 8 cube maps, a volume can be defined that adequately encompasses the range of positions adopted by a typical user's head as they naturally move when looking around a virtual environment in 360°. As a result, the second viewer will subsequently be able to look around the stereoscopic spherical panorama in a natural fashion and see a faithful reproduction of the environment when doing so.

In operation, in an embodiment of the present invention the viewing means can generate the two images to present to the second viewer by using the closest cube map to the stereoscopic viewpoints, and offsetting pixels of the reproduced images from those of the cube map according to the relative distance of these viewpoints from the viewpoint of that cube map. This approach allows for a smooth automatic transition from sourcing one cube map for image information to another as the second viewer's viewpoints traverse the bounding space. Where, as a result of this process, gaps are formed by the relative motion of foreground and back ground objects, the missing pixels can be identified based upon the angular position of the gaps with respect to the second viewer's left and/or right eye viewpoint (as applicable) and the relative position and orientation of the second viewer's left and/or right eye viewpoint to a neighbouring cube map position. The summation of these positions and angles will identify the position of the pixels to be used from a spherical projection of the neighbouring cube map to fill in the gaps. If however, the associated distance information indicates that those pixels in fact still relate to the foreground object, then a different cube map can be selected for the same process.

In this way, stereoscopic images of a captured virtual environment can be viewed by a second user in a stereoscopic spherical panorama when wearing a VR HMD, such that they can look around the environment naturally and enjoy a substantially similar immersive view of that environment as was seen by the original user, but can do so in accordance with their own head movements and not those of the original user.

Modifications

In an embodiment of the present invention, the snapshot means instructs the in-game renderer (or its own renderer) not to render particle effects.

In an embodiment of the present invention, the snapshot means instructs the in-game renderer to make transparent objects opaque, or instructs the in-game renderer to make transparent objects less transparent by a predetermined proportion, such as 50%, 75% or 90%. This reduces the subjectively undesirable effect of background objects that are visible through transparent foreground objects not properly moving according to expected parallax when the rendered images are regenerated for the second viewer. This is because the combination of the cube map and the depth map will treat the visible background features as being part of the appearance of the foreground object, and not separate features in their own right.

Alternatively, in an embodiment of the present invention, where a transparent pixel is detected in a rendered image for a cube map, a depth value is recorded for the background behind the transparent pixel at that particular angle. Subsequently when generating the stereoscopic images, the visible pixel in the image can be moved according to the second depth value. In this case, the snapshot means may instruct the in-game renderer to make transparent objects more transparent, in order to reduce any image artefacts caused by semi-transparent features of the foreground object.

Interaction Between the First and Second Embodiments

Referring to FIG. 6 and FIGS. 4B and 4A, it will be appreciated that a representation of a virtual environment captured according to the second embodiment includes within it a representation according to the first embodiment (i.e. 2 or 4 cube maps on a common plane, without their associated depth information).

This allows a representation of a virtual environment captured according to the second embodiment to be used as the source for a representation according to either embodiment.

The viewing the virtual environment using the techniques of the second embodiment will generally give a better experience and may be preferable where a second viewer has a device capable of the image processing needed to smoothly look around a representation based on the second embodiment, (e.g. a user of another entertainment device and head mounted display).

However viewing the virtual environment using the simpler techniques of the first embodiment may be of use where the captured image information needs to be downloaded; in this case the first embodiment may be used like a preview function; a subset of the information captured according to the second embodiment can be provided to allow viewing of the spherical panorama according to the first embodiment, requiring less data to be downloaded before a view of the environment can be seen; the user may then opt to download the rest of the data required to view the environment using the techniques of the second embodiment.

Similarly, the second user may be a casual user who would benefit from using the first embodiment, such as where the captured representation has been uploaded to a social media service and a user of that service is accessing it via a simpler device such as a mobile phone with split-screen software and a head mounting (see http://www.durovis.com/dive.html), or similarly an inherently wearable but low-powered device such as Google Glass®. In this case just the subset of information needed to view the environment according to the first embodiment may be downloaded. Again this has the advantage of reducing the data needed to be downloaded onto a mobile device.

Usage

As noted above, typically the snapshot means is integrated into the OS or an SDK, allowing for a uniform user interface to be provided between applications. Hence in an embodiment of the present invention, a first user presses a 'share' button on their controller. The OS or software incorporated into the game or middleware by the SDK then pauses the game (i.e. suspends or freezes the game state) and checks whether the current application is displaying a game environment that is appropriate for image capture (i.e. a game world represented in a virtual 3D space that enables a 360° spherical panorama to be captured).

The user is then presented with options associated with the share button, including the option to capture a panorama if the current game state passes the above check. Optionally where there are no other options, or where a head mounded display is detected, then a panorama may be automatically captured if the current game state passes the above check.

The captured image data (and depth information in the second embodiment) are saved as a set of associated files (for example in a zip or similar container).

Subsequently the user can either view the image themselves using the viewing means (such as software on the entertainment device that is also part of the OS, middleware or game), and can also upload the captured image data to one or more supported social media hosts, such as the PlayStation Network®, but also potentially other hosts such as Twitter®, Tumblr® Instagram®, Facebook®, Google Plus®, and others. The file container may have a dedicated file extension allowing the captured image data to be associated with a viewing means on any capable device, so that the captured image data can also be circulated by email and the like or hosted by any website and downloaded from it by a variety of client devices. Optionally the captured image data can be uploaded comprising the captured image data of the second embodiment (a plurality of cube maps and depth maps) or just comprising the captured image data of the first embodiment (two or four cube maps). Optionally when uploaded as captured image data of the second embodiment, two or four cube maps are marked (for example using flags in container data) as for use when viewing according to the first embodiment. In this way social media servers or local applications can select the appropriate data for the appropriate viewing scheme, which in turn may be user selected or determined by the type of client device.

SUMMARY

Figure 7:
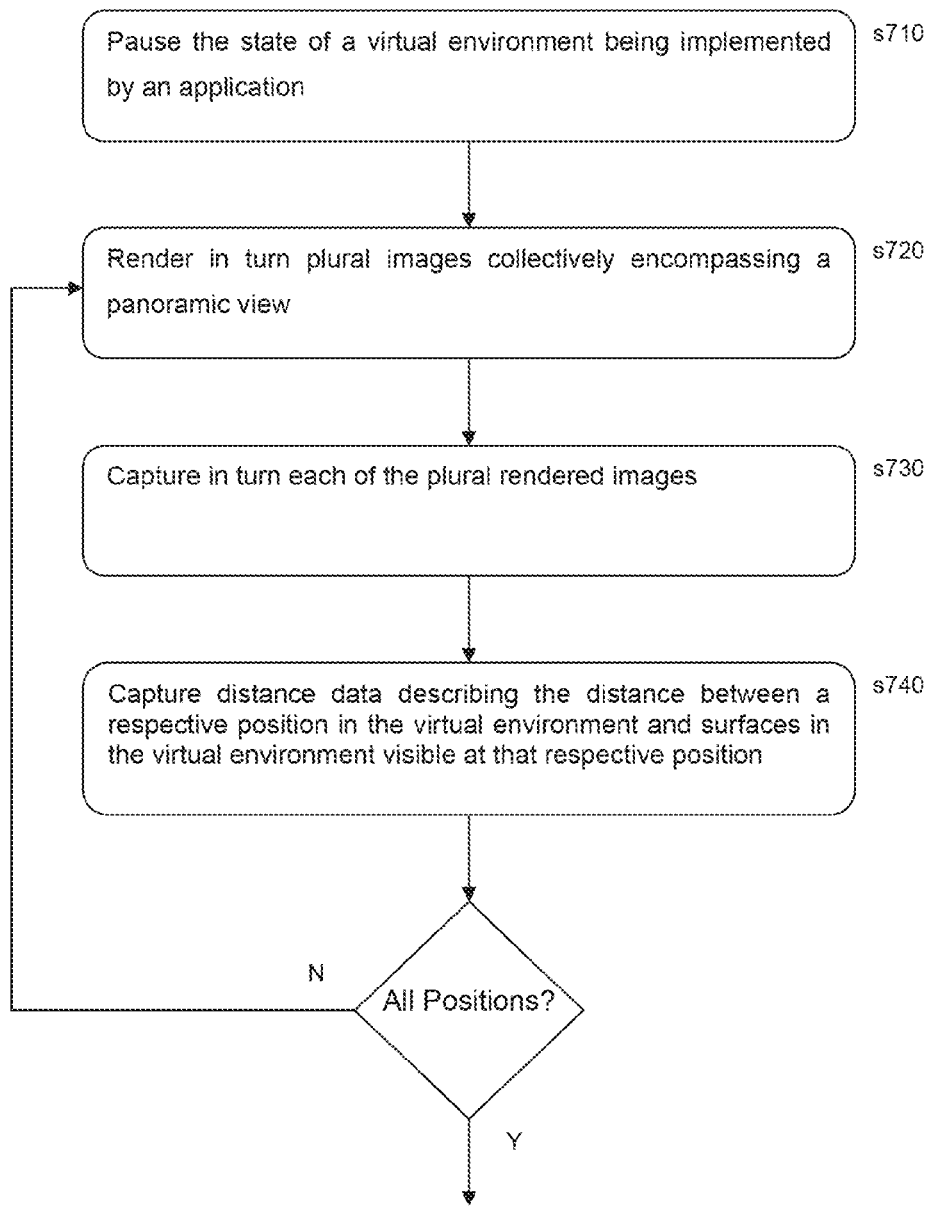
FIG. 7 is a flow diagram of a method of stereoscopic panoramic image capture of a virtual environment, in accordance with a second embodiment of the present invention.

Referring now to FIG. 7, in a summary embodiment of the present invention, as described previously a method of stereoscopic panoramic image capture of a virtual environment comprises:

In a first step s710, pausing the state of a virtual environment being implemented by an application; and for each of a plurality of positions in the virtual environment, in a second step s720, rendering in turn plural images collectively encompassing a panoramic view, in a third step s730 capturing in turn each of the plural rendered images; and in a fourth step s740 capturing distance data describing the distance between a respective position in the virtual environment and surfaces in the virtual environment visible at that respective position, wherein the plural positions in the virtual environment form vertices of a bounding space within which left and right viewpoints of a stereoscopic image can be formed.

In an instance of the summary embodiment, as described previously the plural images encompassing a panoramic view at a respective position in the virtual environment form one selected from the list consisting of:

i. a cube map; and
ii. a dual paraboloid.

In an instance of the summary embodiment, as described previously the number of positions in the virtual environment is one selected from the list consisting of:

i. four;
ii. five;
iii. six; and
iv. eight.

In an instance of the summary embodiment, as described previously the rendering of an image may comprise distorting the virtual environment in the render to correct for distortion arising from a subsequent spherical projection of the image.

In an instance of the summary embodiment, as described previously the rendering of an image may incorporate more detail within the image than a real-time rendering implemented during normal operation of the application.

In an instance of the summary embodiment, as described previously predetermined elements of the virtual environment (such as first person avatar elements) may be omitted from at least all but one of the plural images rendered at a respective position.

In an instance of the summary embodiment, as described previously graphical components that are not part of the virtual environment but which appear during normal operation of the application (such as heads-up displays or health/score statuses) may not be included in the plural rendered images.

In an instance of the summary embodiment, as described previously the method may comprise the step of detecting the activation of a dedicated user interface control associated with initiating the method of stereoscopic panoramic image capture of any preceding claim.

In an instance of the summary embodiment, as described previously the method may comprise the step of saving a captured stereoscopic panoramic image data set as a file or set of associated files comprising the plural images at each position as well as the distance data at each position, together with data indicating at least two of the positions whose plural images may be used to generate a stereoscopic panoramic image without using the distance data. For example, the two positions may be those closest to or coincident with the viewpoints displayed to the user when they triggered the capture processes, as this will provide the best stereoscopic reproduction of the scene in the direction of most likely interest to the original user when viewing the capture according to the first embodiment above.

In an aspect of the above summary embodiment, an apparatus adapted for implementing the method of stereoscopic panoramic image capture of a virtual environment comprises processing means (such as a central processing unit or a processor thereof, operating under suitable software instruction) operable to run an application that implements a virtual environment, pausing means (again for example a central processor, typically responding to user interaction with an input such as a 'share' button) operable to pause the state of the virtual environment being implemented by the application, and rendering means (typically the central processor, a graphics processor, or a combination to the two) operable to render images of the virtual environment; and in which for each of a plurality of positions in the virtual environment, the rendering means is arranged to render in turn plural images collectively encompassing a panoramic view, the processing means is arranged to capture in turn each of the plural rendered images; and the processing means is arranged to capture distance data describing the distance between a respective position in the virtual environment and surfaces in the virtual environment visible at that respective position, wherein the plural positions in the virtual environment form vertices of a bounding space within which left and right viewpoints of a stereoscopic image can be formed.

Figure 8:
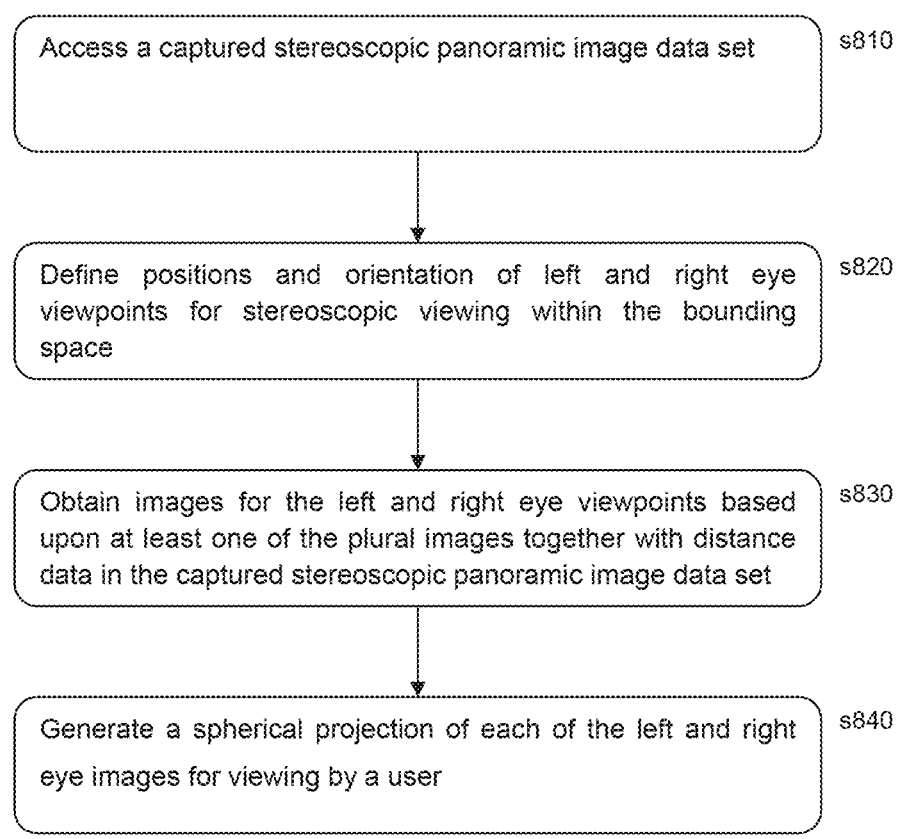
FIG. 8 is a flow diagram of a method of viewing a captured stereoscopic panoramic image, in accordance with a second embodiment of the present invention.

Referring now also to FIG. 8, in a summary embodiment of the present invention a method of viewing a captured stereoscopic panoramic image comprises:

In a first step s810, accessing a captured stereoscopic panoramic image data set comprising distance data and plural images at each of a plurality of positions, where the plurality of positions define vertices of a bounding space;

In a second step s820, defining the positions and orientation of left and right eye viewpoints for stereoscopic viewing, where the positions are within the bounding space; and In a third step s830, obtaining images for the left and right eye viewpoints based upon at least one of the plural images together with distance data in the captured stereoscopic panoramic image data set; and In a fourth step s840, generating a spherical projection of each of the left and right eye images for viewing by a user.

In an instance of the summary embodiment, as described previously the step of obtaining at least one of the images for the left and right eye viewpoints may comprise generating the image from one or more of the plural images at one or more of the plurality positions by shifting pixels of that image responsive to corresponding distance information, and where the shifting of pixels leave gaps in the generated image, the method may comprise the step of obtaining pixel information to fill the gaps from one or more other of the plural images at one or more of the plurality positions.

In an aspect of the above summary embodiment, an apparatus adapted for implementing the method of viewing a captured stereoscopic panoramic image of a virtual environment, comprises access means (for example a hard disk, flash memory or network connection) operable to access a captured stereoscopic panoramic image data set comprising distance data and plural images at each of a plurality of positions, where the plurality of positions define vertices of a bounding space, and processing means (such as a central processing unit, a graphics processor or a combination of the two) operable to define the positions and orientation of left and right eye viewpoints for stereoscopic viewing, where the positions are within the bounding space; wherein the processing means is arranged to obtain images for the left and right eye viewpoints based upon at least one of the plural images together with distance data in the captured stereoscopic panoramic image data set. Generating means (typically the central processor, a graphics processor or a combination of the two) operable to generate a spherical projection of each of the left and right eye images for viewing by a user. Here, 'obtaining' images for a left or right eye viewpoint may involve accessing an existing image from the data set (for example where that image is consistent with one of the left or right eye viewpoints) or generating a new image by a process comprising shifting pixel elements of an existing image as a function of distances defined by the distance data, as described previously herein.

Figure 9:
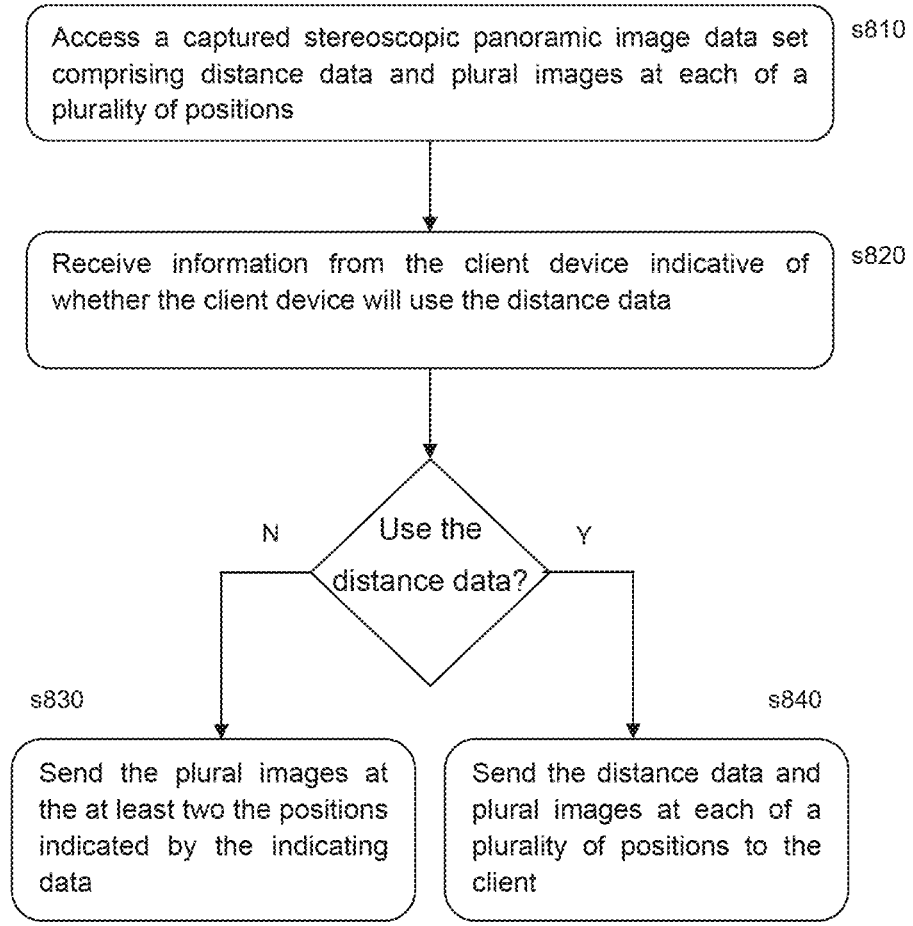
FIG. 9 is a flow diagram of a method of serving a captured stereoscopic panoramic image to a client device, in accordance with embodiments of the present invention.

Referring now also to FIG. 9, in a summary embodiment of the present invention a method of serving a captured stereoscopic panoramic image to a client device comprises:

in a first step s910, accessing a captured stereoscopic panoramic image data set comprising distance data and plural images at each of a plurality of positions, where the plurality of positions define vertices of a bounding space, together with data indicating at least two of the positions whose plural images may be used to generate a stereoscopic panoramic image without using the distance data;

in a second step s920, receiving information from the client device indicative of whether the client device will use the distance data; and if the received information indicates that the client device will use the distance data, in a third step s930 sending the distance data and plural images at each of a plurality of positions to the client; and if the received information indicates that the client device will not use the distance data, in a fourth step s940 sending the plural images at the at least two positions indicated by the indicating data in the captured stereoscopic panoramic image data set.

In an aspect of the above summary embodiment, a server may be adapted for implementing the method of serving a captured stereoscopic panoramic image to a client device by configuration with suitable software.

It will be appreciated that the above methods may be carried out on conventional hardware suitably adapted as applicable by software instruction or by the inclusion or substitution of dedicated hardware.

Thus the required adaptation to existing parts of a conventional equivalent device may be implemented in the form of a computer program product comprising processor implementable instructions stored on a tangible non-transitory machine-readable medium such as a floppy disk, optical disk, hard disk, PROM, RAM, flash memory or any combination of these or other storage media, or realised in hardware as an ASIC (application specific integrated circuit) or an FPGA (field programmable gate array) or other configurable circuit suitable to use in adapting the conventional equivalent device. Separately, such a computer program may be transmitted via data signals on a network such as an Ethernet, a wireless network, the Internet, or any combination of these of other networks.

The foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of stereoscopic panoramic image capture of a virtual environment implemented by one or more processing devices, comprising the steps of:

pausing a state of a virtual environment being implemented by an application; and for each of a plurality of positions in the virtual environment:

rendering in turn plural images collectively encompassing a panoramic view, capturing in turn each of the plural rendered images, capturing distance data describing a distance between a respective position in the virtual environment and surfaces in the virtual environment visible at that respective position, and saving the captured images and distance data as a captured stereoscopic panoramic image data set;

wherein the plurality of positions in the virtual environment form vertices of a bounding space within which to place left and right viewpoints of a stereoscopic image generated using pixel information from the captured images.

2. A method according to claim 1, in which the plural images encompassing a panoramic view at a respective position in the virtual environment form one selected from the group consisting of:

i. a cube map; and ii. a dual paraboloid.

3. A method according to claim 1, in which a number of positions in the virtual environment is one selected from the group consisting of:

i. four;

ii. five;

iii. six; and iv. eight.

4. A method according to claim 1 in which the rendering of a given one of the plural images comprises distorting the virtual environment in the render to correct for distortion arising from a subsequent spherical projection of the given image.

5. A method according to claim 1 in which the rendering of a given one of the plural images incorporates more detail within the given image than a real-time rendering implemented during normal operation of the application.

6. A method according to claim 1 in which predetermined elements of the virtual environment are omitted from at least all but one of the plural images rendered at a respective position.

7. A method according to claim 1 in which graphical components that are not part of the virtual environment but which appear during normal operation of the application are not included in the plural rendered images.

8. A method according to claim 1 comprising the step of:
detecting activation of a dedicated user interface control associated with initiation of the method.

9. A method according to claim 1, comprising saving a captured stereoscopic panoramic image data set as a file or set of associated files comprising the plural images at each position as well as the distance data at each position, together with data indicating at least two of the positions whose plural images may be used to generate a stereoscopic panoramic image without using the distance data.

10. A non-transitory computer-readable storage medium storing computer instructions thereon, the computer instructions, when executed by a processor, cause the processor to carry out a method of stereoscopic panoramic image capture of a virtual environment, comprising the steps of:
pausing a state of a virtual environment being implemented by an application; and
for each of a plurality of positions in the virtual environment:
rendering in turn plural images collectively encompassing a panoramic view,
capturing in turn each of the plural rendered images,
capturing distance data describing a distance between a respective position in the virtual environment and surfaces in the virtual environment visible at that respective position, and
saving the captured images and distance data as a captured stereoscopic panoramic image data set;
wherein the plurality of positions in the virtual environment form vertices of a bounding space within which to place left and right viewpoints of a stereoscopic image generated using pixel information from the captured images.

11. A method of viewing a captured stereoscopic panoramic image, comprising the steps of:
accessing a captured stereoscopic panoramic image data set comprising distance data and plural images at each of a plurality of positions, where the plurality of positions define vertices of a bounding space;
defining, by one or more processing devices, the positions and orientation of left and right eye viewpoints for stereoscopic viewing, where the positions are within the bounding space; and
obtaining, by the one or more processing devices, images for the left and right eye viewpoints based upon pixel information from the plural images together with distance data in the captured stereoscopic panoramic image data set; and
generating a spherical projection of each of the left and right eye images for presentation to a user.

12. The method of claim 11, in which obtaining at least a given one of the images for the left and right eye viewpoints comprises:
generating the given image from one or more of the plural images at one or more of the plurality positions by shifting pixels of that image responsive to corresponding distance information;
and where the shifting of pixels leave gaps in the generated image, the method further comprises the step of:
obtaining pixel information to fill the gaps from one or more other of the plural images at one or more of the plurality positions.

13. A non-transitory computer-readable storage medium storing computer instructions thereon, the computer instructions, when executed by a processor, cause the processor to carry out a method of viewing a captured stereoscopic panoramic image, comprising the steps of:
accessing a captured stereoscopic panoramic image data set comprising distance data and plural images at each of a plurality of positions, where the plurality of positions define vertices of a bounding space;
defining the positions and orientation of left and right eye viewpoints for stereoscopic viewing, where the positions are within the bounding space; and
obtaining images for the left and right eye viewpoints based upon pixel information from the plural images together with distance data in the captured stereoscopic panoramic image data set; and
generating a spherical projection of each of the left and right eye images for presentation to a user.

14. An apparatus for stereoscopic panoramic image capture of a virtual environment, comprising:
one or more processing devices configured to run an application that implements a virtual environment;
pausing means for pausing a state of the virtual environment being implemented by the application; and
rendering means for rendering images of the virtual environment; and in which:
for each of a plurality of positions in the virtual environment,
the rendering means is arranged to render in turn plural images collectively encompassing a panoramic view,
the one or more processing devices are arranged to capture in turn each of the plural rendered images; and
the one or more processing devices are arranged to capture distance data describing a distance between a respective position in the virtual environment and surfaces in the virtual environment visible at that respective position,
wherein the plurality of positions in the virtual environment form vertices of a bounding space within which left and right viewpoints of a stereoscopic image can be formed.

15. An apparatus for viewing a captured stereoscopic panoramic image of a virtual environment, comprising:
access means for accessing a captured stereoscopic panoramic image data set comprising distance data and plural images at each of a plurality of positions, where the plurality of positions define vertices of a bounding space;
one or more processing devices configured to define the positions and orientation of left and right eye viewpoints for stereoscopic viewing, where the positions are within the bounding space; wherein:
the one or more processing devices is arranged to obtain images for the left and right eye viewpoints based upon at least one of the plural images together with distance data in the captured stereoscopic panoramic image data set; and generating means for generating a spherical projection of each of the left and right eye images for presentation to a user.

\* \* \* \* \*